US008866349B2

(12) United States Patent
Li et al.

(10) Patent No.: US 8,866,349 B2
(45) Date of Patent: Oct. 21, 2014

(54) SOLENOID

(71) Applicant: Johnson Electric S.A., Murten (CH)

(72) Inventors: Yue Li, Hong Kong (CN); Jin Yun Gan, Hong Kong (CN); Chui You Zhou, Hong Kong (CN); Yong Wang, Hong Kong (CN); Xiao Ning Zhu, Hong Kong (CN)

(73) Assignee: Johnson Electric S.A., Murten (CH)

( * ) Notice: Subject to any disclaimer, the term of this patent is extended or adjusted under 35 U.S.C. 154(b) by 210 days.

(21) Appl. No.: 13/626,543

(22) Filed: Sep. 25, 2012

(65) Prior Publication Data

US 2013/0076161 A1 Mar. 28, 2013

(30) Foreign Application Priority Data

Sep. 26, 2011 (CN) .......................... 2011 1 0289060

(51) Int. Cl.
*H02K 41/00* (2006.01)
*H01F 7/16* (2006.01)
*H01H 3/28* (2006.01)

(52) U.S. Cl.
CPC ............... *H01H 3/28* (2013.01); *H01F 7/1615* (2013.01)
USPC .................... 310/14; 310/15; 310/23; 310/30

(58) Field of Classification Search
USPC ................................... 310/14–15, 23–25, 30
See application file for complete search history.

(56) References Cited

U.S. PATENT DOCUMENTS

| | | | | | |
|---|---|---|---|---|---|
| 3,980,908 | A * | 9/1976 | McClintock | 396/465 |
| 3,984,707 | A * | 10/1976 | McClintock | 310/15 |
| 5,065,126 | A * | 11/1991 | Suzuki et al. | 335/222 |
| 5,138,291 | A * | 8/1992 | Day | 335/258 |
| 5,161,779 | A | 11/1992 | Graner et al. | |
| 5,239,277 | A * | 8/1993 | Vielot | 335/255 |
| 5,453,724 | A * | 9/1995 | Seymour et al. | 335/172 |
| 6,615,780 | B1 * | 9/2003 | Lin et al. | 123/90.17 |
| 2002/0195884 | A1 * | 12/2002 | Ichii et al. | 310/15 |
| 2006/0061442 | A1 * | 3/2006 | Brooks | 335/220 |
| 2009/0072636 | A1 | 3/2009 | Gruden | |

FOREIGN PATENT DOCUMENTS

| | | |
|---|---|---|
| JP | 5029131 | 2/1993 |
| JP | 2003347118 | 12/2003 |
| JP | 2008135590 | 6/2008 |

* cited by examiner

*Primary Examiner* — Thanh Lam
(74) *Attorney, Agent, or Firm* — Muncy, Geissler, Olds & Lowe, P.C.

(57) ABSTRACT

A solenoid includes a stationary member, a movable member being movable relative to the stationary member and spring disposed between the stationary member and the movable member. The stationary member includes a housing with an end wall and a side wall, a first permanent magnet attached to the end wall, a second permanent magnet attached to the side wall and a magnetic flux concentrator configured to concentrate a magnetic field generated by the second permanent magnet with a magnetic field generated by the first permanent magnet. The movable member includes a head inserted into the housing. The head is made of magnetically conductive material. The stationary member further includes a coil surrounding the head of the movable member. When the coil receives a pulse current, the movable member is driven from an extended/retracted position to a retracted/extended position.

10 Claims, 3 Drawing Sheets

SOLENOID

CROSS REFERENCE TO RELATED APPLICATIONS

This non-provisional patent application claims priority under 35 U.S.C. §119(a) from Patent Application No. 201110289060.6 filed in The People's Republic of China on Sep. 26, 2011.

FIELD OF THE INVENTION

This invention relates to a solenoid, also known as an electromagnetic actuator.

BACKGROUND OF THE INVENTION

A typical solenoid comprises a stationary member, a movable member and a spring disposed between the stationary and movable members. The movable member is usually connected to or integral with a plunger or piston, which can be in the form of an output shaft, as the working element. Such solenoids can be employed in a variety of applications such as circuit breakers, switches, latches, etc. The stationary member comprises a permanent magnet and a coil. When the coil is un-energized, the movable member may be maintained in an extended or retracted position by the magnetic force generated by the permanent magnet cooperating with the spring force generated by the spring. When the coil receives a pulse current in one direction, the movable member is driven from the extended position to the retracted position. When the coil receives a pulse current in the reverse direction, the movable member is driven from the retracted position to the extended position. The extended/retracted positions may correspond to open/close positions of a circuit breaker, for example.

In order to firmly maintain the movable member in the extended and retracted positions, especially in the retracted position, the permanent magnet is usually made of rare earth material to increase the magnetic force between the permanent magnet and the movable member. However, rare earth material is undergoing extreme cost increases.

Hence there is a desire for an improved solenoid that can generate increased attracting force between the permanent magnet and the movable member, even if no rare earth magnet is used.

SUMMARY OF THE INVENTION

Accordingly, in one aspect thereof, the present invention provides a solenoid comprising: a stationary member comprising a housing with an end wall and a side wall, a first permanent magnet attached to the end wall, at least one second permanent magnet attached to the side wall and a magnet flux concentrator configured to concentrate a magnetic field generated by the second permanent magnet with a magnetic field generated by the first permanent magnet; a movable member being movable relative to the stationary member in a direction between a retracted position and an extended position, the movable member comprising a head inserted into the housing, the head being made of magnetically conductive material; and a spring disposed between the stationary member and the movable member; wherein the stationary member further comprises a coil surrounding the head of the movable member.

Preferably, the magnet flux concentrator comprises a first section attached to the first permanent magnet, and a second section attached to the second permanent magnet.

Preferably, the first section comprises a projection projecting toward the head of the movable member in the direction.

Preferably, the stationary member further comprises a bobbin fixed with respect to the housing, the coil being wound on the bobbin and the head of the movable member being inserted into the bobbin.

Preferably, the spring is a coil spring received in the bobbin and is fixed to the head of the movable member and the projection.

Preferably, the housing cooperates with the movable member to provide a magnetic flux path between the permanent magnets and the movable member.

Preferably, the housing has a cylindrical configuration or a rectangular configuration.

Preferably, the second magnet has a greater thickness at two opposite ends than at a middle thereof.

Preferably, the first and second permanent magnets are made of ferrite.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
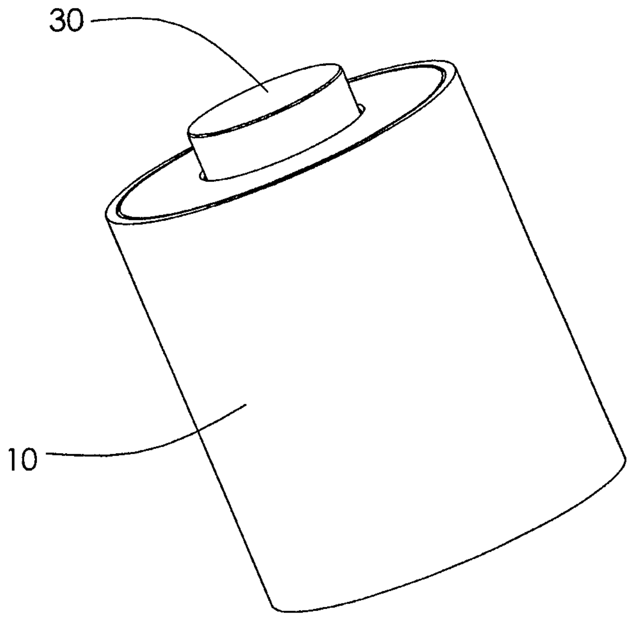
FIG. 1 illustrates a solenoid in accordance with a preferred embodiment of the present invention.
Figure 2:
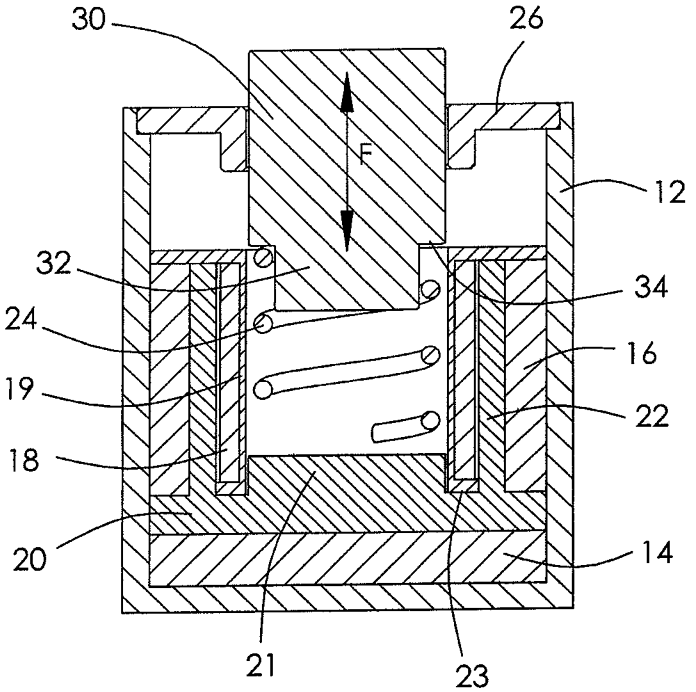
FIG. 2 is a cross-sectional view of the solenoid of FIG. 1.

FIGS. 1 and 2 illustrate a solenoid according to a preferred embodiment of the present invention. The solenoid comprises a stationary member 10 and a movable member 30. The stationary member 10 comprises a housing 12, a first permanent magnet 14, a second permanent magnet 16, a coil 18 and a magnetic flux concentrator.

The housing 12 has a cylindrical configuration with an open end and a closed end. The first permanent magnet 14 has a plate configuration with a round periphery. The first permanent magnet 14 is attached to an inner surface of an end wall of the housing 12. The first permanent magnet 14 is magnetized along the axis of the housing 12, which corresponds to the moving direction of the movable member. The second permanent magnet 16 has a ring shape and is attached to an inner surface of the sidewall of the housing 12. The second permanent magnet 16 is magnetized along the radial direction of the housing 12. The second permanent magnet 16 may be an integral ring magnet or a plurality of segmented magnets arranged in a ring.

The magnetic flux concentrator is made of magnetically conductive material, such as electrical steel, and comprises a plate-shaped first section 20 and a cylindrical second section 22 extending axially from the first section 20. The first section 20 is attached to the first permanent magnet 14. A projection 21 is formed at the center of the first section 20 and an annular groove 23 is therefore formed between an outer circumferential surface of the projection 21 and an inner circumferential surface of the second section 22. The outer surface of the second section 22 is attached to an inner surface of the second permanent magnet 16.

The coil 18 has a ring shape and is wound on a bobbin 19 which is inserted into the annular groove 23 and fixed with respect to the housing 12. The coil 18 faces the second section 22.

The movable member 30 is made of magnetically conductive material and comprises a head 32 which is inserted into the bobbin 19 from the open end of the housing 12. The head 32 has a diameter which is substantially the same as the projection 21. A spring 24 is disposed between the stationary member 10 and the movable member 30. Specifically, the spring 24 is a coiled spring wound about the head 32 and the projection 21. One end of the spring 24 abuts against a step 34 formed at the end of the head 32 and the other end abuts against an inner surface of the annular groove 23 of the first section 20 of the magnetic flux concentrator.

A cover 26 is attached to the open end of the housing 12. The movable member 30 extends through the cover 26 and is slidable between retracted and extended positions in a direction F which is coaxial with the axis of the housing 12. When the coil 18 is not energized the movable member 30 can be maintained in the retracted or extended positions. In the retracted position, the movable member 30 is held by the first and second permanent magnets 14, 16 and the head 32 of the movable member 30 is close to the projection 21 and the spring 24 is compressed. In the extended position, the head 32 of the movable member 30 is away from the projection 21 and the first spring 24 is partly released. Spring force generated by the spring 24 is substantially equal to or greater than the attracting force generated between the head 32 and the projection 21 plus a force due to gravity acting on the movable member 30.

A stop structure may be used to position the movable member 30 in the extended position. The coil 18 when receiving a pulse current in a first direction, creates a magnetic field that results in the movable member 30 being electromagnetically driven from the retracted position to the extended position. The coil 18 when receiving a pulse current in a second direction opposite to the first direction, creates a magnetic field that results in the movable member 30 being electromagnetically driven from the extended position to the retracted position.

Figure 6:
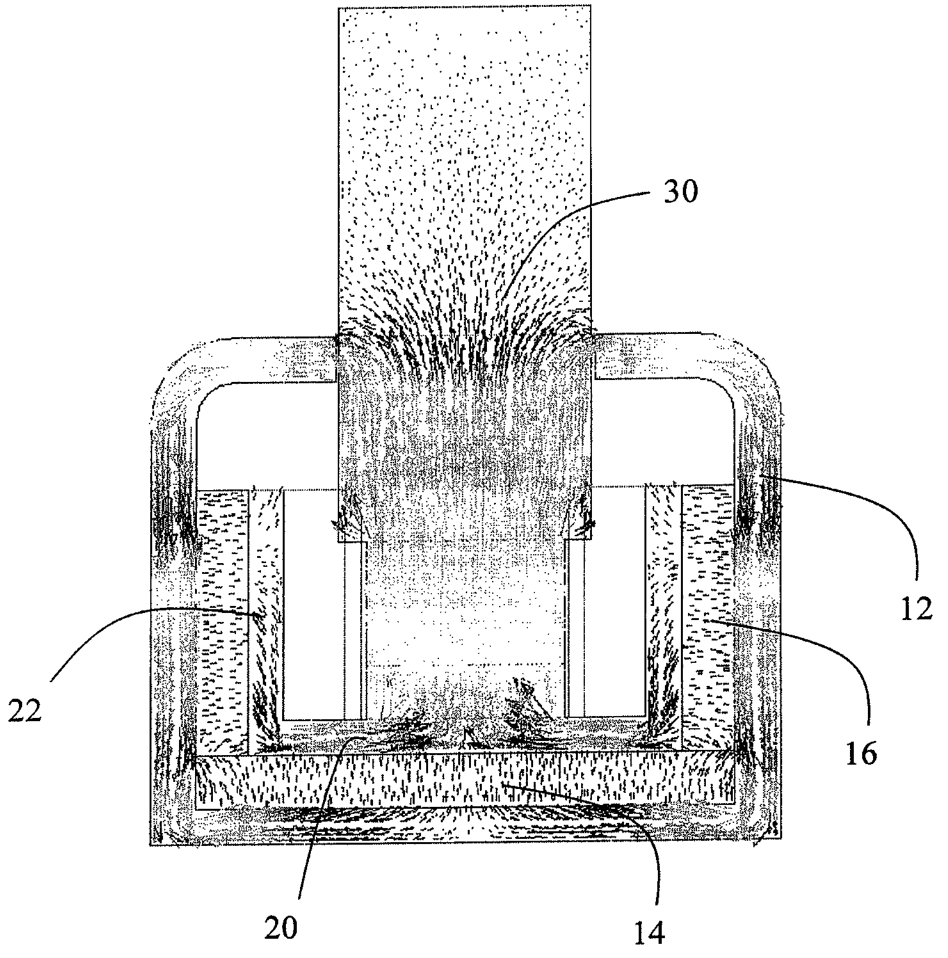
FIG. 6 illustrates distributions of magnetic flux of the solenoid.

In the present invention, the magnetic field generated by the second permanent magnet 16 is concentrated by the magnetic flux concentrator with the magnetic field generated by the first permanent magnet 14, as shown in FIG. 6. Thus, the magnetic flux density passing through the movable member 30 is greatly increased, especially when the movable member 30 is located in the retracted position. Thus, the first permanent magnet 14 and second permanent magnet 16 may be made of ferrite magnet material, to thereby decrease the cost of the solenoid. Of course, one of or both of the first permanent magnet 14 and second permanent magnet 16 may be made of rare earth magnet material if the cost is not an issue.

Preferably, the housing 12 and cover 26 are made of magnetically conductive material in order to provide a magnetic flux return path between the permanent magnets 14, 16 and the movable member 30. Alternatively, the housing 12 and cover 26 may be made of magnetically non-conductive material and a magnetic flux return plate is use to provide the magnet flux return path between the permanent magnets 14, 16 and the movable member 30. The sections of the magnetic flux concentrator 20, 22 may be integrally formed or separately formed and then fixed together.

The solenoid of the present invention may be used in the field of circuit breakers, electromagnetic switches, electromagnetic valves, latches, etc.

Figure 3:
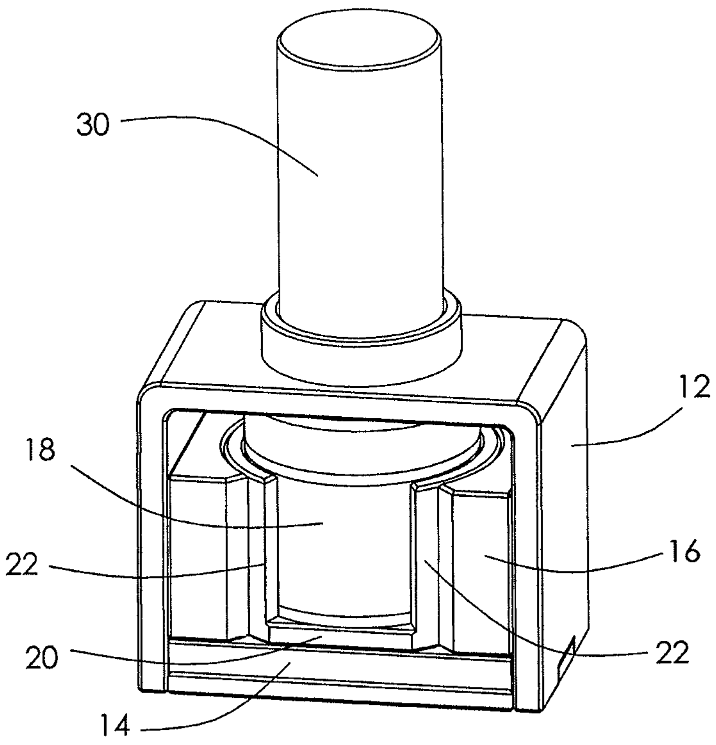
FIG. 3 illustrates a solenoid in accordance with a second preferred embodiment of the present invention.
Figure 4:
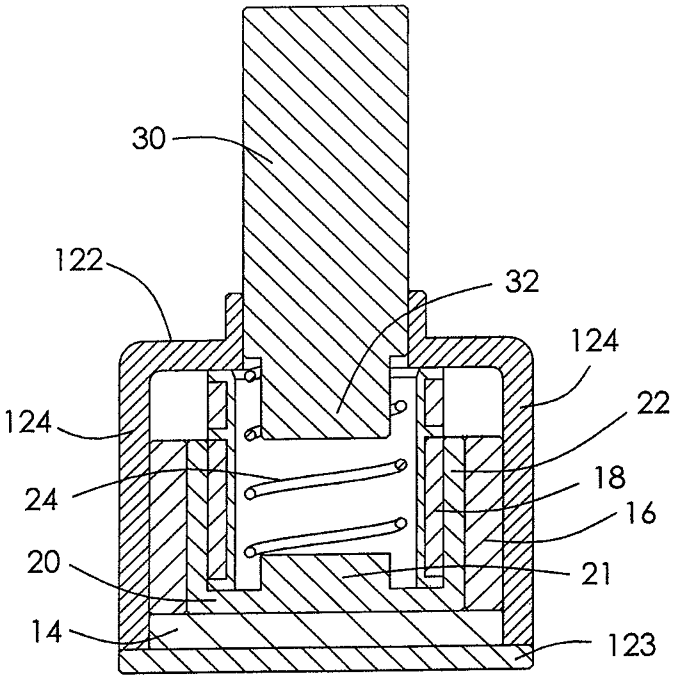
FIG. 4 is sectional view of the solenoid of FIG. 3.
Figure 5:
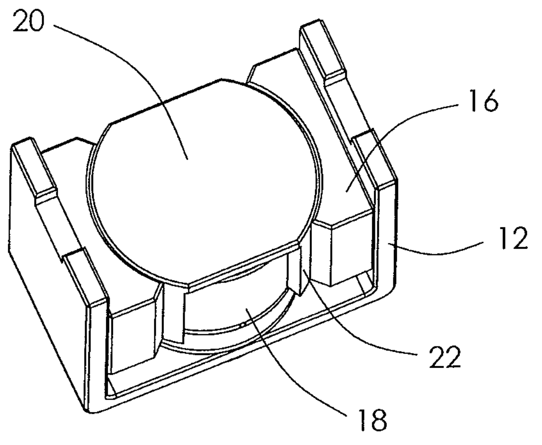
FIG. 5 is a bottom view of the solenoid of FIG. 3, the bottom wall of the housing and first permanent magnet being removed for showing interior components.

FIGS. 3 to 5 illustrate a solenoid according to a second preferred embodiment of the present invention. This solenoid is similar to the solenoid of the first embodiment described herein before. In the solenoid of the second embodiment, the housing 12 has a rectangular configuration and comprises a pair of parallel end walls 122, 123 and a pair of parallel side walls 124. The flux concentrator is formed with two arcuate second sections 22. The second permanent magnet 16 comprises two magnets respectively attached to inner surfaces of the side walls 124. Preferably, the inner surfaces of the second magnets 16 are arcuate and the outer surfaces of the second magnets 16 are flat. Thus, the second magnet 16 has a greater thickness in its magnetized direction at two opposite ends than at the middle thereof. This kind of second magnet 16 makes good use of the available space within the housing 12 to thereby increase the amount of magnetic flux passing through the movable member 30. The outer surfaces of the second sections 22 of the magnetic flux concentrator are arcuate and respectively attached to the inner surfaces of the second magnets 16. The head 32 of the movable member 30 passes through a through hole defined at one of the end walls 122 of the housing 12 to enter into the bobbin 19. The solenoid of the second embodiment is suitable for applications with a narrow space.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A solenoid comprising:

a stationary member comprising a housing with an end wall and a side wall, a first permanent magnet attached to the end wall, at least one second permanent magnet attached to the side wall and a magnet flux concentrator configured to concentrate a magnetic field generated by the second permanent magnet with a magnetic field generated by the first permanent magnet;

a movable member being movable relative to the stationary member in a direction between a retracted position and an extended position, the movable member comprising a head inserted into the housing, the head being made of magnetically conductive material; and a spring disposed between the stationary member and the movable member;

wherein the stationary member further comprises a coil surrounding the head of the movable member.

2. The solenoid of claim 1, wherein the magnet flux concentrator comprises a first section attached to the first permanent magnet, and a second section attached to the second permanent magnet.

3. The solenoid of claim 2, wherein the first section comprises a projection projecting toward the head of the movable member in the direction.

4. The solenoid of claim 3, wherein the stationary member further comprises a bobbin fixed with respect to the housing, the coil being wound on the bobbin and the head of the movable member being inserted into the bobbin.

5. The solenoid of claim 4, wherein the spring is a coil spring received in the bobbin and is fixed to the head of the movable member and the projection.

6. The solenoid of claim 1, wherein the housing cooperates with the movable member to provide a magnetic flux path between the permanent magnets and the movable member.

7. The solenoid of claim 1, wherein the housing has a cylindrical configuration.

8. The solenoid of claim 1, wherein the housing has a rectangular configuration.

9. The solenoid of claim 8, wherein the second magnet has a greater thickness at two opposite ends than at a middle thereof.

10. The solenoid of claim 1, wherein the first and second permanent magnets are made of ferrite.

* * * * *